US012613904B2

(12) United States Patent
Priestas et al.

(10) Patent No.: US 12,613,904 B2
(45) Date of Patent: Apr. 28, 2026

(54) SYSTEMS AND METHODS FOR INFORMATION RETRIEVAL AND KNOWLEDGE DISCOVERY

(71) Applicant: ACCENTURE GLOBAL SOLUTIONS LIMITED, Dublin (IE)

(72) Inventors: James Robert Priestas, Alexandria, VA (US); Tara Lynn O'Gara, Chicago, IL (US); Sarat Gurram, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 18/891,756

(22) Filed: Sep. 20, 2024

(65) Prior Publication Data

US 2026/0087064 A1 Mar. 26, 2026

(51) Int. Cl.
| | |
|---|---|
| *G06F 16/435* | (2019.01) |
| *G06F 16/2457* | (2019.01) |
| *G06F 16/438* | (2019.01) |

(52) U.S. Cl.
CPC ...... *G06F 16/435* (2019.01); *G06F 16/24578* (2019.01); *G06F 16/438* (2019.01)

(58) Field of Classification Search
CPC . G06F 16/24578; G06F 16/435; G06F 16/438
See application file for complete search history.

(56) References Cited

U.S. PATENT DOCUMENTS

| | | | |
|---|---|---|---|
| 6,766,320 B1 | 7/2004 | Wang et al. | |
| 12,174,864 B1 * | 12/2024 | Umrao | G06F 16/90324 |
| 12,266,065 B1 * | 4/2025 | Kharbanda | G06T 19/006 |
| 2010/0299303 A1 * | 11/2010 | Horster | G06F 16/435 707/E17.014 |

(Continued)

OTHER PUBLICATIONS

Arshmeet Kaur, "Gen AI Enterprise Search Software: Get Answers, Not Results!", Leena AI, LeenaAI, 10 pages, download from the Internet on Sep. 20, 2024. https://leena.ai/blog/gen-ai-enterprise-search-software/.

*Primary Examiner* — Jay A Morrison
(74) *Attorney, Agent, or Firm* — Mannava & Kang, P.C.

(57) ABSTRACT

Systems and methods for information retrieval and knowledge discovery are disclosed. The method includes, receiving a user input from a user via a user interface, wherein the user input comprises a user requirement and a user preference, identifying a user intent and a context of the received user input by parsing a plurality of keywords within the received user input, and extracting multimedia content from a structured data source based on the identified user intent, the context, the user requirement, and the user preference, wherein the structured data source stores the multimedia content retrieved from a plurality of data repositories. The method further includes, processing the extracted multimedia content using a generative Artificial Intelligence (AI) model, generating at least one response to the received user input based on the processed multimedia content, wherein the at least one response comprises the processed multimedia content with corresponding to one or more of the plurality of data repositories and outputting the at least one response on a user interface of a user device.

15 Claims, 4 Drawing Sheets

(56)  References Cited

U.S. PATENT DOCUMENTS

2020/0401555 A1\* 12/2020 Magazine ............... G10L 15/26
2022/0398291 A1\* 12/2022 Menon ................. G06F 16/951
2022/0405314 A1\* 12/2022 Du .......................... G06F 40/56

\* cited by examiner

300

| RECEIVE A USER INPUT | ~305 |

| IDENTIFY A USER INTENT AND A CONTENT OF THE USER INPUT | ~310 |

| EXTRACT MULTIMEDIA CONTENT FROM A STRUCTURED DATA SOURCE | ~315 |

| PROCESS THE EXTRACTED MULTIMEDIA CONTENT USING A GENERATIVE ARTIFICIAL INTELLIGENCE (AI) MODEL | ~320 |

| GENERATE AT LEAST ONE RESPONSE TO THE RECEIVED USER INPUT AND OUTPUT THE RESPONSE | ~325 |

SYSTEMS AND METHODS FOR INFORMATION RETRIEVAL AND KNOWLEDGE DISCOVERY

FIELD OF THE INVENTION

The present disclosure generally relates to the field data analysis and, more particularly, to a system and a method for enhanced information retrieval and knowledge discovery.

BACKGROUND

Information retrieval and knowledge discovery are the important processes in modern data landscape. Information retrieval and knowledge discovery processes enable the organizations to extract insights from vast amount of data. Information retrieval includes locating and accessing of relevant information from structured and instructed sources, often using sophisticated search algorithms and indexing techniques. Knowledge discovery includes pattern identification, relationship identification and deriving insights within the data, often through data mining and analysis techniques. As enterprises continue to the generate and collect enormous volumes of data, effective information retrieval and knowledge discovery becomes increasingly paramount in utilizing the full potential of data assets of the enterprises.

With enormous volumes of data, enterprises face significant challenges in information retrieval and discovery, primarily due to overwhelming volume of unstructured data. The unstructured data is often distrusted across multiple clouds, devices and applications, creating a fragmented environment that hampers efficient access to the critical data or insights. Conventional methods and systems fall short, with at least 45% of the information retrieved deemed irrelevant, and more than 80% of the users'experiencing difficulties in retrieving data they need.

SUMMARY

This summary is provided to introduce a selection of concepts in a simple manner that is further described in the detailed description of the disclosure. This summary is not intended to identify key or essential inventive concepts of the subject matter nor is it intended for determining the scope of the disclosure.

A method for enhanced information retrieval and knowledge discovery is disclosed. The system includes a processor, and a memory communicably coupled to the processor, wherein the memory comprises processor-executable instructions which, when executed by the processor, cause the processor to, receive a user input from a user via a user interface, wherein the user input comprises a user requirement and a user preference, identify a user intent and a context of the received user input by parsing a plurality of keywords within the received user input, extract multimedia content from a structured data source based on the identified user intent, the context, the user requirement, and the user preference, wherein the structured data source stores the multimedia content retrieved from a plurality of data repositories, process the extracted multimedia content using a generative Artificial Intelligence (AI) model, generate at least one response to the received user input based on the processed multimedia content, wherein the at least one response comprises the processed multimedia content with corresponding links to one or more of the plurality of data repositories, and output the at least one response on a user interface of a user device.

Further disclosed is a method for enhanced information retrieval and knowledge discovery. The method includes, receiving a user input from a user via a user interface, wherein the user input comprises a user requirement and a user preference, identifying a user intent and a context of the received user input by parsing a plurality of keywords within the received user input, extracting multimedia content from a structured data source based on the identified user intent, the context, the user requirement, and the user preference, wherein the structured data source stores the multimedia content retrieved from a plurality of data repositories processing the extracted multimedia content using a generative Artificial Intelligence (AI) model, generating at least one response to the received user input based on the processed multimedia content, wherein the at least one response comprises the processed multimedia content with corresponding to one or more of the plurality of data repositories, and outputting the at least one response on a user interface of a user device.

It is appreciated that methods in accordance with the present disclosure can include any combination of the aspects and features described herein. That is, the method in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Various embodiments in accordance with the present disclosure will be described with reference to the drawings, in which.

Like reference numbers and designations in the various drawings indicate like elements.

DETAILED DESCRIPTION

Figure 1:
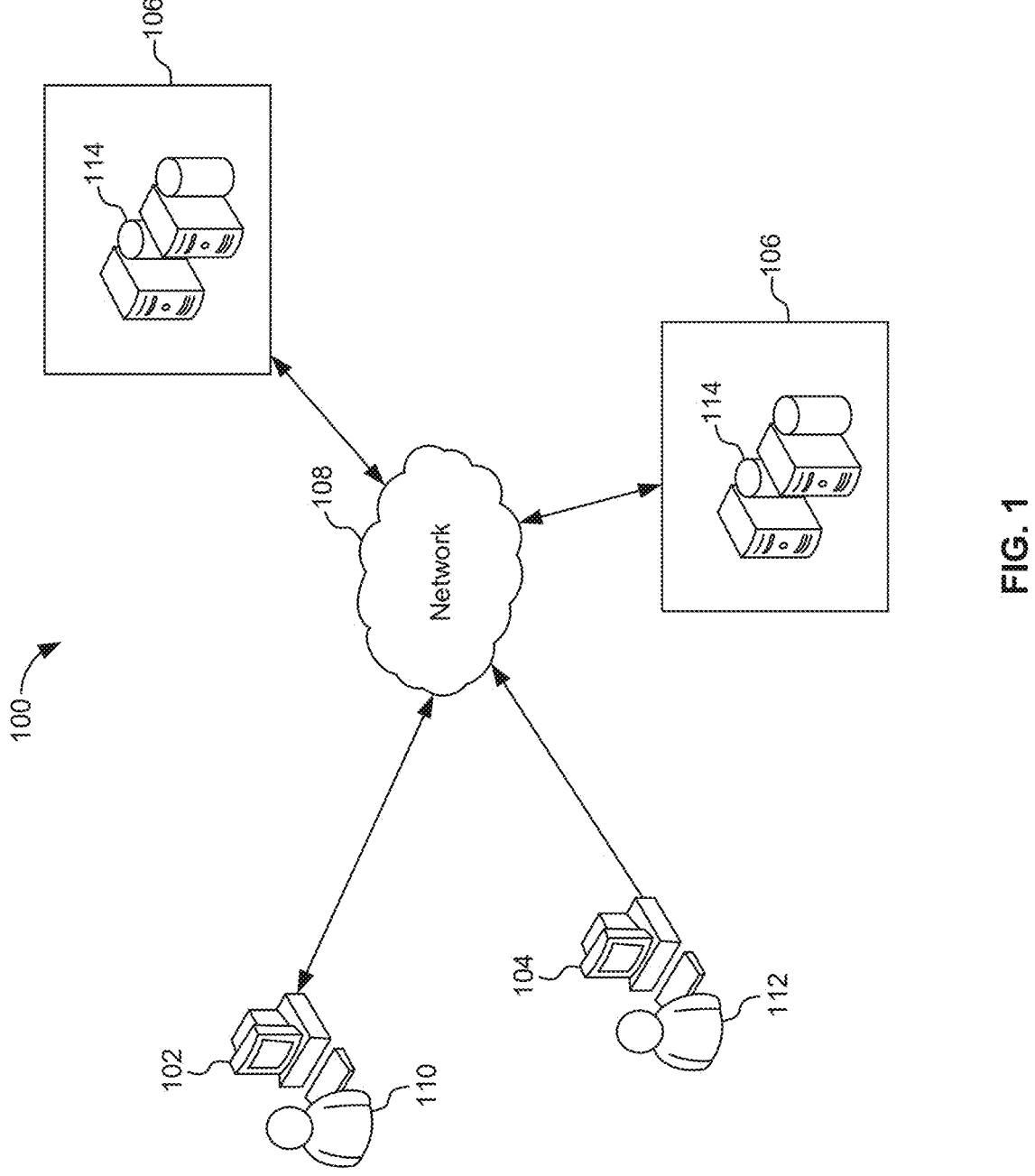
FIG. 1 depicts an example environment 100 that can be used to execute implementations of the present disclosure.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope of the claimed subject matter.

Reference to any "example" herein (e.g., "for example," "an example of," by way of example" or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The term "comprising" when utilized means "including, but not necessarily limited to"; it specifically indicates open-ended inclusion or membership in the so-described combination, group, series and the like.

The term "a" means "one or more" unless the context clearly indicates a single element.

"First," "second," etc., are labels to distinguish components or blocks of otherwise similar names but does not imply any sequence or numerical limitation.

"And/or" for two possibilities means either or both of the stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A. and N" where A through N are possibilities means "and/or" for the stated possibilities (e.g., at least one A, at least one N, at least one A and at least one N, etc.).

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures, and techniques may be shown without unnecessary detail in order to avoid obscuring example embodiments.

The specification and drawings are to be regarded in an illustrative rather than a restrictive sense. It will, however, be evident that various modifications and changes may be made thereunto without departing from the broader spirit and scope of the invention as set forth in the claims.

To address the one or more limitations described in the background, embodiments of the present disclosure disclose a system and a method for enhanced information retrieval and knowledge discovery. In an embodiment of the present disclosure, the system includes a structured data source storing multimedia content in a structural manner, wherein the multimedia content is retrieved from one or more of a textual repository, an audio repository, and a video repository. Upon receiving receive a user input including a user requirement and a user preference, the system identifies a user intent and a context of the received user input by parsing a plurality of keywords within the received user input, extracts multimedia content from the structured data source based on the identified user intent, the context, the user requirement, and the user preference, and process the extracted multimedia content using a generative Artificial Intelligence (AI) model. Further, the system generates at least one response to the received user input based on the processed multimedia content, wherein the at least one response includes the processed multimedia content with corresponding links to the plurality of data sources, and then outputs the at least one response on a user interface of a user device.

FIG. 1 depicts an example environment 100 that can be used to execute implementations of the present disclosure. In some examples, the example environment 100 enables users associated with respective systems to execute requests to retrieve information from one or more data sources by invoking one or more trained models in accordance with implementations of the present disclosure. The example environment 100 includes computing devices 102 and 104, back-end systems 106, and a network 110. In some examples, the computing devices 102 and 104 are used by respective users 114 and 116 to log into and interact with the platforms and running applications according to implementations of the present disclosure.

In the depicted example, the computing devices 102 and 104 are depicted as desktop computing devices. It is contemplated, however, that implementations of the present disclosure can be realized with any appropriate type of computing device (e.g., smartphone, tablet, laptop computer, voice-enabled devices). In some examples, the network 110 includes a local area network (LAN), wide area network (WAN), the Internet, or a combination thereof, and connects web sites, user devices (e.g., computing devices 102, 104), and back-end systems (e.g., the back-end systems 106). In some examples, the network 110 may include a wired and/or a wireless communications link. For example, mobile computing devices, such as smartphones can utilize a cellular network to access the network 110.

In the depicted example, the back-end systems 106 each include at least one server system 120. In some examples, the at least one server system 120 hosts one or more computer implemented services that users can interact with by using computing devices 102 and 104. For example, components of enterprise systems and applications can be hosted on one or more of the back-end systems 106. In some examples, a back-end system can be provided as an on-premises system that is operated by an enterprise or a third-party taking part in cross-platform interactions and data management. In some examples, a back-end system can be provided as an off-premises system (e.g., cloud or on-demand) that is operated by an enterprise or a third-party on behalf of an enterprise.

In some examples, the computing devices 102 and 104 each include computer-executable applications executed thereon. In some examples, the computing devices 102 and 104 each include a web browser application executed thereon, which can be used to display one or more web pages of platform running applications. In some examples, each of the computing devices 102 and 104 can display one or more Graphical User Interfaces (GUIs) that enable the respective users 114 and 116 to interact with the computing platform. In accordance with implementations of the present disclosure, the back-end systems 106 may host enterprise applications or systems that require data sharing and data privacy. In some examples, the computing device 102 and/or the computing device 104 can communicate with the back-end systems 106 over the network 110.

In some implementations, at least one of the back-end systems 106 can be implemented in a cloud environment that includes at least one server system 120. In the example of FIG. 1, the back-end server 106 can represent various forms of servers including, but not limited to, a web server, an application server, a proxy server, a network server, and/or a server pool. In general, server systems accept requests for application services and provide such services to any number of client devices (for example, the computing device 102 over the network 110).

In an embodiment of the present disclosure, the system for enhanced information retrieval and knowledge discovery is implemented with the back-end system 106 and a user may use the computing devices 102 and 104 for providing input to the system, the input including one or more requirements or one or more preferences or both. The requirements may include information required by the user and the one or more preferences may include but not limited to format of the information, type of information, filters, etc. For example, the requirements may include information on an enterprise capability, process and contributions, the preference may specify the specific industry, for example, in field of medical, artificial intelligence (AI) or auto. In another example, the requirements and preferences may be related to material from an enterprise repository in the form of video, PPT or pdf formats or any in other required formats. In yet another example, a user looking for information material from an enterprise repository that were created in specific time duration for example, documents and video created in last quarter (or any other time period) may specify the same in the requirements and preferences.

Figure 2:
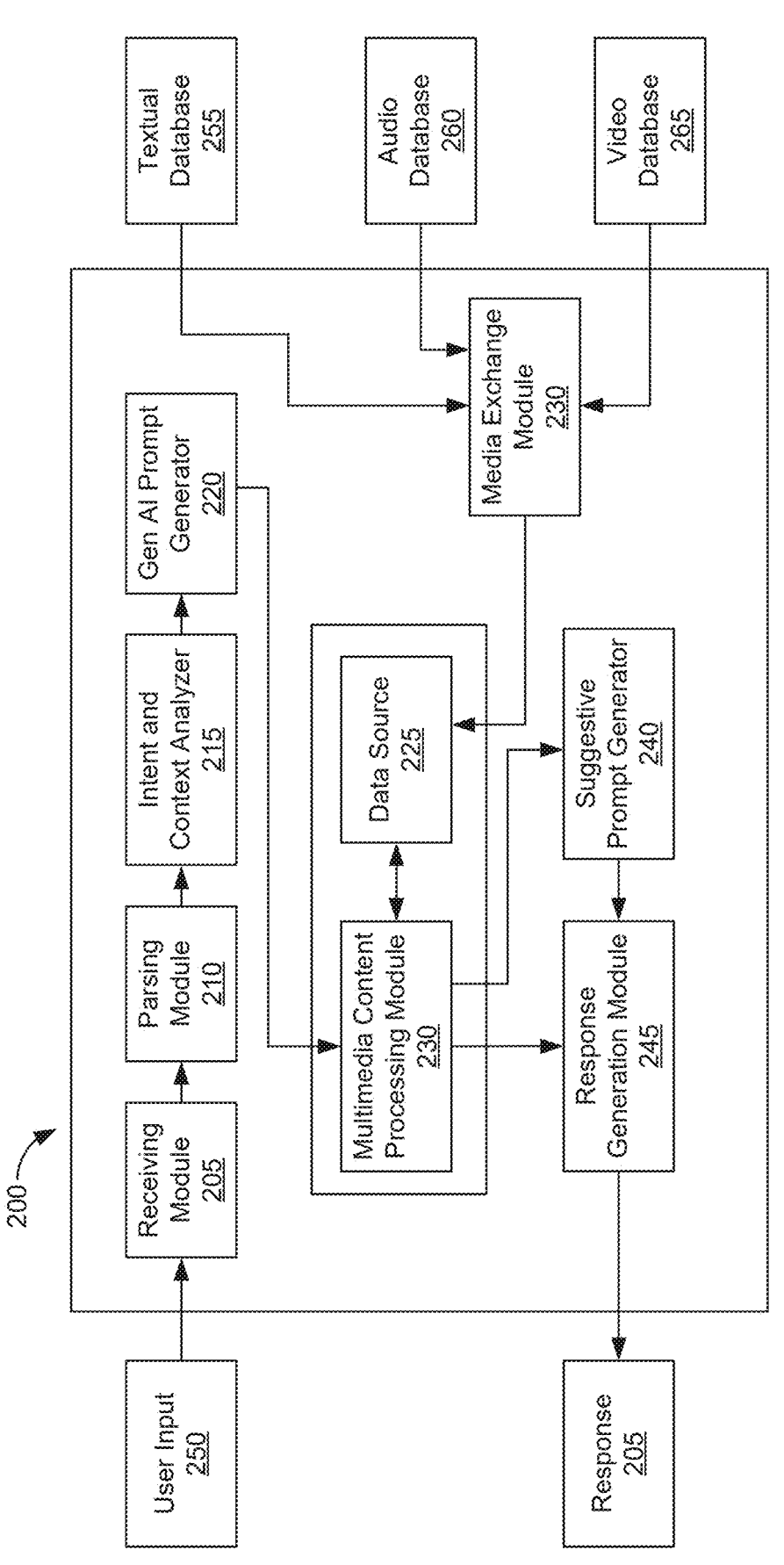
FIG. 2 depicts a block diagram of the system for information retrieval and knowledge discovery, in accordance with an embodiment of the present disclosure.

FIG. 2 depicts a block diagram of the system for information retrieval and knowledge discovery, in accordance with an embodiment of the present disclosure. As shown, the system 200 includes a receiving module 205, a parsing module 210, an input and context analyzer 215, a Generation Artificial Intelligence (GenAI) prompt generator 220, a data source 225, a media exchange module 230, a multimedia content processing module 235, a suggestive prompt generator 240, and a response generation module 245.

In an embodiment of the present disclosure, the receiving module 205 is configured for receiving a user input 250 (a prompt) including one or more requirements or one or more preferences or both. It is to be noted that the user input 250 is received from a user of the computing device 102, for example, and a user may input queries in natural language expressing the requirements, preferences, filters, etc. The user input 250 may include but not limited to text defining the content to be retrieved, document type, industry specific information, filters, etc.

Upon receiving the user input 250, the parsing module 210 parses the user input 250 to identify one or more keywords within the received user input 250. The parsing as described herein may include but not limited to text cleaning to remove any irrelevant text, stop words, and punctuations, tokenization, etc. Then the parsing module 210 uses one or more of part-of-speech (POS) tagging method, frequency analysis, Named Entity Recognition (NER), synonym identification methods, etc. to identify the one or more keywords within the user input 250. The identified keywords are fed to the intent and context analyzer 215.

In an embodiment of the present disclosure, the intent and context analyzer 215 analyzes the user intent and the context of the user input 250 based on the identified keywords. In an embodiment, the intent and context analyzer 215 extracts key insights of the received user input by mapping the one or more keywords within the received user input with a prestored insight table. Then the user intent and the context of the user input 250 is correlated with the extracted key insights using a generative AI model. To identify and classify the intent, the Gen AI model is trained on labeled datasets to recognize different categories of intent. Such categories may include but not limited to information seeking, exploration, etc. Further, to identify the context, the model is configured to consider one or more of a user history, temporal context, domain specificity, etc. In an embodiment, the labelled data used for training the Gen AI model may include but not limited to historical instances of the user input and category of the intent. For example, an input of 'what is weather like this weekend' is mapped to category of 'Outdoor Activities'. Alternatively, an existing LLM may be tuned with such data arranged in JSON, for example. Based on the additional data used for training, the Gen AI model picks one of the standard categories provided for any user question. Then the identified intent, the context and the keywords are fed to the Gen AI prompt generator 220.

On receiving the identified intent, the context and the keywords, the Gen AI prompt generator 220 generates contextually relevant one or more prompts for retrieving the information (multimedia content) from the data source 225. It is to be noted that the Gen AI prompt generator 220 may use Generative Pre-trained Transformer (GPT) model for generating the one or more prompts for retrieving the multimedia content from the data source 225. Considering an example user input 'how is applied intelligence is being used in a company X?', the intent and context analyzer 215 identify the context as "Artificial Intelligence use", keyword may be "Company X". Then the Gen AI prompt generator 220 generates prompts such as "what specific AI applications are used by the company X?", "how does AI enhance services of the Company X".

In an embodiment of the present disclosure, the data source 225 is a structured data source which is configured to store the multimedia content retrieved from the one or more repositories (databases or any type of sources). That is, in an embodiment of the present disclosure, the unstructured data from the one or more repositories are retrieved, processed using the media exchange module 230 and stored in a structured manner in the data source 225. Referring to FIG. 2, the one or more repositories includes but not limited to a textual repository 255, an audio repository 260 and a video repository 265.

In an embodiment of the present disclosure, the media exchange module 230 process the text retrieved from the textual repository 255. The processing as described herein includes but not limited to text cleaning, tokenization, Named Entity Recognition (NER), POS tagging, dependency parsing, key phrase and relation extraction, etc. The processed text along with the source information (for example, URL) is stored in the data source 225 for further processing and retrieval based on the user input 250.

Further, the media exchange module 230 retrieves the audio from the audio repository 260, processes the audio and stores in the data source 225. In an embodiment, the processing includes format conversion and audio cleaning which may include but not limited to filtering, normalization, noise reduction, etc. Further, in an embodiment of the present disclosure, the audio is split into smaller segments (chunks) based on the time, topic changes, speaker turns, etc. Furthermore, the media exchange module 230 generates transcripts for the audio and annotates the audio chunks with labels which may include but not limited to audio topic, speaker identification, audio category, sentiment, etc. The audio with the source information, the audio chunks, the transcripts with labels, and source information of the audio is stored in the data source 225. In an embodiment, the generates transcripts of the audio are stored as a document in the data source 225.

In an embodiment of the present disclosure, the media exchange module 230 retrieves the video from the video repository 265, processes the video and stores in the data source 225. The processing may include format conversion and video compression. Further, in an embodiment of the present disclosure, the video is split into smaller segments (shots) based on the time, topic changes, speaker turns, etc. Furthermore, the media exchange module 230 generates transcripts for the video and annotates the video shots with labels which may include but not limited to video topic, speaker identification, audio category, sentiment, etc. The video with the source information, the video shots, the transcripts with labels, and source information of the video is stored in the data source 225. In an embodiment, the media exchange module 230 uses a video intelligence Application Programming Interface (API) to interact with the video repository 265 to extract shots, labels and transcripts. Specifically, the video from the video repository 265 is retrieved via API calls to the video repository 265. Other metadata information is pulled through media exchange API calls using libraries such as, for example, Python programming language libraries. Furthermore, the API interactions are managed using libraries such as, for example, Python programming language libraries, which are tools for handling HTTP requests and processing responses (e.g., in JSON or XML formats) received from the API. For example, the Python libraries may be used to formulate the HTTP requests for making calls to the API, and JSON or XML libraries for parsing the response data received from the API, ensuring efficient and seamless integration of the video intelligence API.

As described, the text, the audio and the video (referred to as multimedia content) retrieved from the one or more repositories are processed and stored in the data source 225. In an embodiment of the present disclosure, the multimedia content is stored along with metadata and keywords to facilitate searchability. The metadata as described herein may include but not limited to title, duration of the content, date of creation, creator or source information, etc., and the keywords are extracted from the multimedia content and may include labels, text from the transcriptions, speaker identification, etc. Hence, the data source 225 stored multimedia content retrieved from various sources in a structured manner along with the metadata and labels to enhance usability and accessibility.

As described, on receiving the user input 250, the intent and context analyzer 215 determines the user intent and the context of the input based on the one or more keywords present in the user input 250, and the Gen AP prompt generator 220 generates one or more prompts for retrieving the multimedia content from the data source 225. In an embodiment of the present disclosure, the multimedia content processing module 230 uses the generated Gen AI prompts for fetching information relevant to the user input 250. That is, the multimedia content processing module 230 may use search APIs and Structured Query Language (SQL) queries for fetching information relevant to the user input 250. Hence, the multimedia content processing module 230 extracts multimedia content from structured data source 225 based on the identified user intent, the context, the user requirement, and the user preference. As described, the multimedia content is retrieved from one or more repositories, processed and stored in the data source 225. In an embodiment of the present disclosure, the process of multimedia content retrieval from one or more repositories and processing of the received multimedia content is performed in real-time upon receiving the user input 250.

Upon extracting multimedia content from the data source 225, the multimedia content processing module 230 processes the extracted multimedia content using a generative Artificial Intelligence (AI) model. In one implementation, the multimedia content processing module 230 derives insights from the extracted multimedia content and leverages Gen AI model to generate natural language response based on the insights gathered from the extracted multimedia content. In an embodiment, the multimedia processing module 230 uses AI models such as Google Cloud Platform (GCP) Video Intelligence to extract information from multimedia. For example, based on the user input 250, the multimedia content processing module 230 may extract multimedia content which corresponds to five different sources. Then the multimedia content processing module 230 generates natural language response independently to generate five summaries or by combining content from two or more sources, for example to generate three responses. In an embodiment, the extracted multimedia content is processed based on one or more of a profile of the user, the identified user intent, the context, the user requirement, and the user preference. For example, LLM model with search and conversation API are used to prepare the summary based on top search result and more relevant content to formulate the AI summary points for the user input. For example, the search and conversation API may be employed to facilitate interactive communication with the LLM. The API allows the LLM to engage in a dialogic process, helping to refine the summary based on iterative feedback and additional context provided by the user. The LLM then synthesizes the information to formulate summary points, wherein the synthesis uses natural language processing techniques such as text extraction, paraphrasing, and semantic analysis to generate the responses. The processed multimedia content including the plurality of responses is fed to the response generation module 245.

In an embodiment, the response generation module 245 assign a rank for each of the plurality of responses based on relevance of each response to the received user input 250. In one implementation, the response generation module 245 extracts keywords from the generated responses and matches with the keywords in the user input 250 to generate score one or more criteria. The one or more criteria may include but not limited to user intent alignment, content appropriateness, user preference match, user profile match, etc. and the score may be assigned on a scale of one to ten, for example. Then a final score for each response may be computed by combining the scores of the individual criteria. Further, different weights may be assigned for one or more criteria based on the importance. In an embodiment, the weights are assigned based on the keywords in the user input and number of matches in the generated response. In another embodiment, the weights are assigned based on the combination of keywords hits, context match, and filter match (for example content format and content category). Upon assigning the score, the at least one response with highest score is selected for presenting to the user. In a preferred embodiment, three responses are selected based the assigned score and the response includes the source information (links or URLs) to one or more of the plurality of data repositories from where the multimedia content is retrieved.

In an embodiment of the present disclosure, the suggestive prompt generator 240 is configured to generate one or more suggestive prompts to the user. The suggestive prompts as described herein refers to prompts for user queries to help with follow-up searches or questions. In an embodiment, the one or more suggestive prompts are generated based on one or more of the user intent, the context, the user requirement, the user preference, the at least one response generated to the received user input, and historical user inputs. While generating the suggestive prompts, the response content is analyzed to identify gaps for further exploration and clarifications. The historical user input refers to past queries and responses to identify patterns, preferences and topic of interest of the user. The one or more suggestive prompts may include but not limited to exploratory prompts, contextual prompts, clarification prompts, etc.

Upon generating the one or more suggestive prompts, the response generation module 245 generates at least one response as described and recommends the one or more suggestive prompts along with the at least one response to the user. In an embodiment, the at least one response to be presented to the user is formatted for the user interface of the computing device 120, for example.

As described, the system disclosed in the present disclosure enables information retrieval and knowledge discovery by storing the multimedia content in a structured manner. The content repositories as described in the present disclosure may include proprietary repository of an enterprise or third-party repository or may include websites or any other content repository or database.

Figure 3:
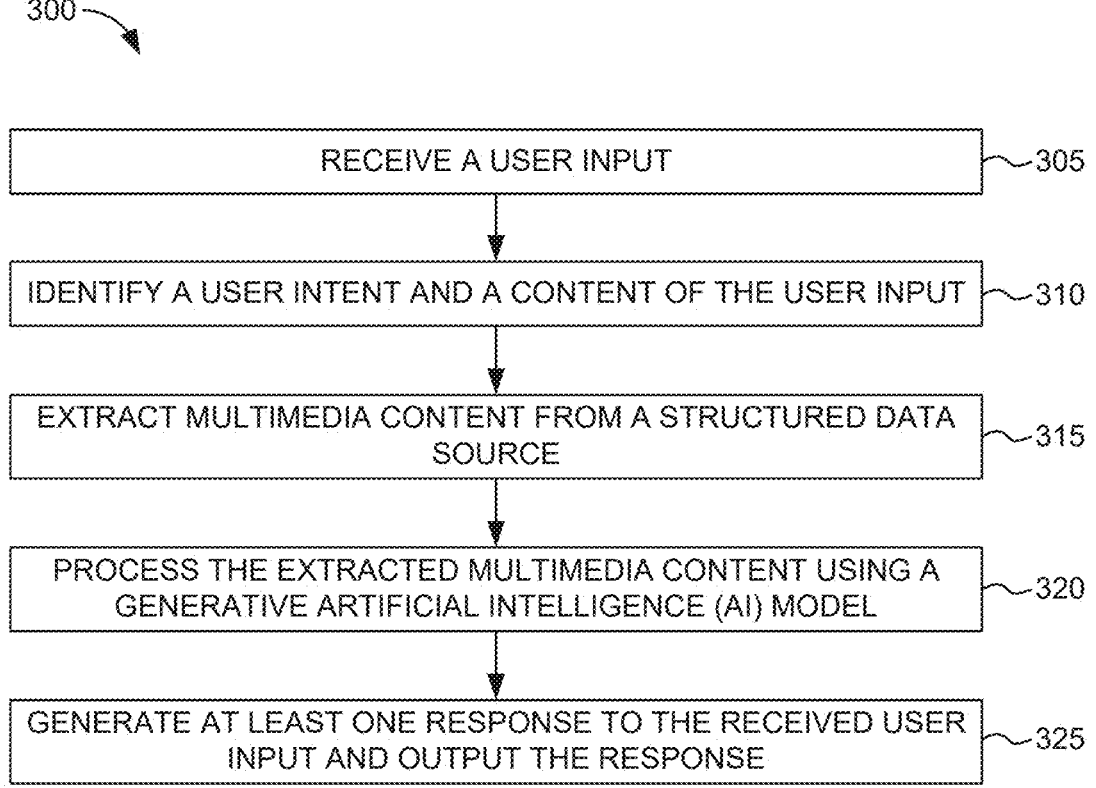
FIG. 3 depicts a flowchart illustrating a method for information retrieval and knowledge discovery, in accordance with an embodiment of the present disclosure.

FIG. 3 depicts a flowchart illustrating a method for information retrieval and knowledge discovery, in accordance with an embodiment of the present disclosure. As shown, at step 305, the receiving module 205 receives a user input from a user via a user interface, wherein the user input includes a user requirement and a user preference. It is to be noted that the user input 250 is received from a user of the computing device 102, for example, and a user may input queries in natural language expressing the requirements, preferences, filters, etc. The user input 250 may include but not limited to text defining the content to be retrieved, document type, industry specific information, filters, etc.

At step 310, the intent and context analyzer 215 identifies a user intent and a context of the received user input by parsing a plurality of keywords within the received user input. In an embodiment, the intent and context analyzer 215 extracts key insights of the received user input by mapping the one or more keywords within the received user input with a prestored insight table. Then the user intent and the context of the user input 250 is correlated with the extracted key insights using a generative AI model. Then the identified intent, the context and the keywords are fed to the Gen AI prompt generator 220.

At step 315, the multimedia content processing module 230 extracts multimedia content from the structured data source 225 based on the identified user intent, the context, the user requirement, and the user preference. That is, the multimedia content processing module 230 uses the Gen AI prompts generated by the Gen AI prompts generator 220 which is configured to generate prompts based on the user input, the intent and the context of the user input.

At step 320, the multimedia content processing module 230 processes the extracted multimedia content using a generative Artificial Intelligence (AI) model. In an embodiment, the multimedia content processing module 230 derives insights from the extracted multimedia content and leverages Gen AI model to generate natural language response based on the insights gathered from the extracted multimedia content. Hence, the multimedia content processing module 230 generates a plurality of responses to the user input.

At step 325, the response generation module 245 generates at least one response based on the processed multimedia content, wherein the at least one response comprises the processed multimedia content with corresponding links to one or more of the plurality of data repositories. In an embodiment, the response generation module 245 assign a rank for each of the plurality of responses based on relevance of each response to the received user input 250. In one implementation, the response generation module 245 extracts keywords from the generated responses and matches with the keywords in the user input 250 to generate score one or more criteria. The one or more criteria may include but not limited to user intent alignment, content appropriateness, user preference match, user profile match, etc. and the score may be assigned on a scale of one to ten, for example. Then a final score for each response may be computed by combining the scores of the individual criteria. Further, different weights may be assigned for one or more criteria based on the importance. Upon assigning the score, the at least one response with highest score is selected for presenting to the user. In a preferred embodiment, three responses are selected based the assigned score and the response includes the source information (links or URLs) to one or more of the plurality of data repositories from where the multimedia content is retrieved.

Further, in an embodiment of the present disclosure, the suggestive prompt generator 240 generates one or more suggestive prompts to the user. In an embodiment, the one or more suggestive prompts are generated based on one or more of the user intent, the context, the user requirement, the user preference, the at least one response generated to the received user input, and historical user inputs.

Upon generating the one or more suggestive prompts, the response generation module 245 generates at least one response as described and recommends the one or more suggestive prompts along with the at least one response to the user. In an embodiment, the at least one response to be presented to the user is formatted for the user interface of the computing device 120, for example.

As described, the system and the method disclosed in the present disclosure enables information retrieval and knowledge discovery by storing the multimedia content in a structured manner. The proposed system and method may be integrated with existing data repositories for extracting multimedia content including text, image, audio and video. This ensures a comprehensive and centralized data source for the analysis and retrieval. Further, the annotated audio and video stored in the data source provides a detailed breakdown of the audio and video content, making them easily searchable and analyzable.

Further, transformation of the retrieved text, audio and video content into structured datasets facilitates advanced AI analysis, including in identifying entities, classifying content, and extracting valuable insights, etc. Furthermore, the suggestive prompts generated based on the historical input and the generated response facilitates the user towards more focused and relevant content search.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

Implementations and all of the functional operations described in this specification may be realized in a generic classical processor system and a quantum computing system.

Figure 4:
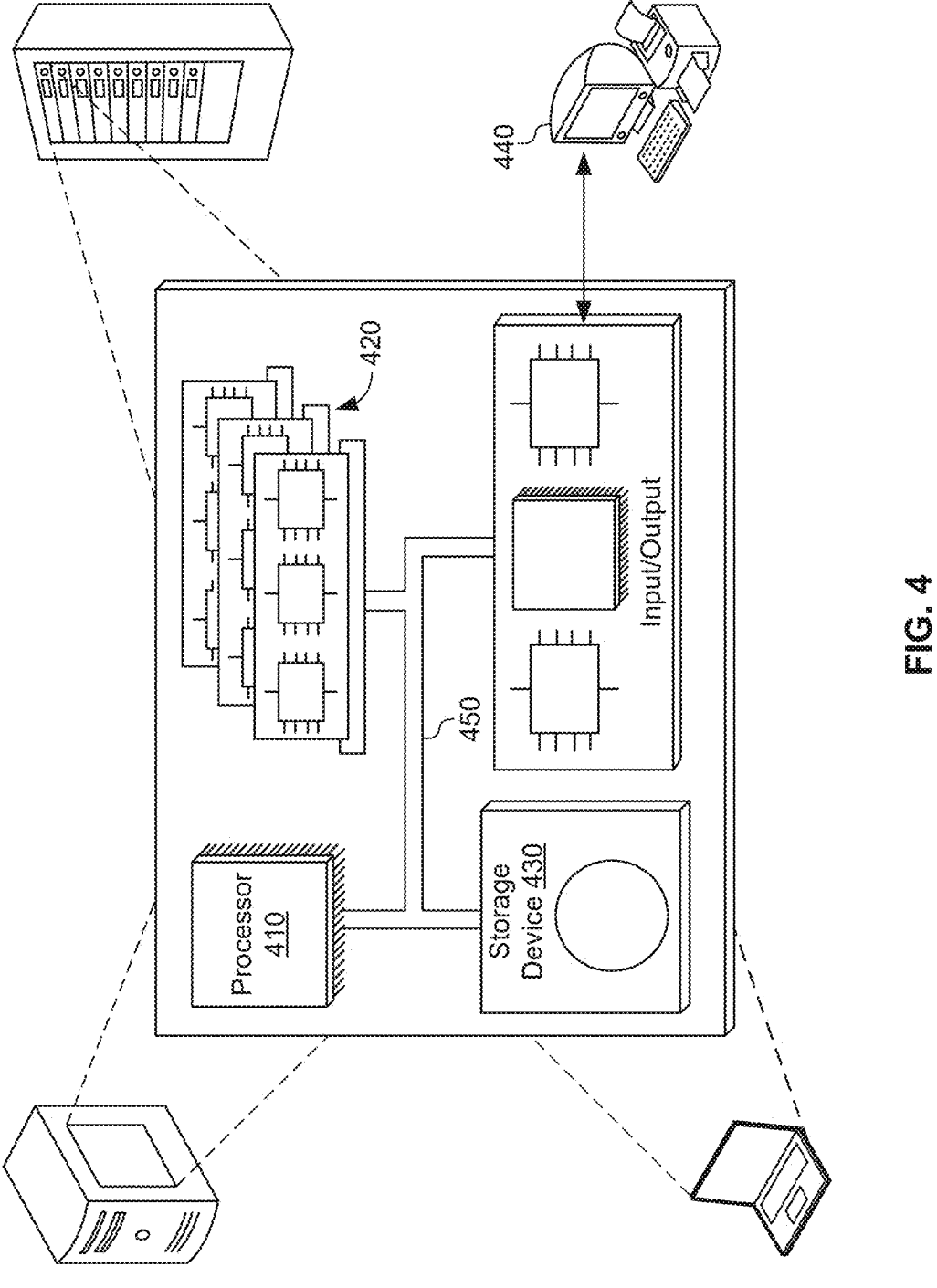
FIG. 4 illustrates a schematic diagram of an exemplary generic processor system.

FIG. 4 illustrates a schematic diagram of an exemplary generic processor system. The system 400 can be used for the operations described in this specification according to some implementations. The system 400 is intended to represent various forms of digital computers, workstations, servers, blade servers, mainframes, and other appropriate computers. The components shown, their connections and relationships, and their functions, are exemplary only, and do not limit implementations of the inventions described and/or claimed in this document. The system 400 includes a processor 410, a memory 420, a storage device 430, and an input/output device 440. Each of the components 410, 420, 430, and 420 are interconnected using a system bus 450. The processor 410 may be enabled for processing instructions for execution within the system 400. In one implementation, the processor 410 is a single-threaded processor. In another implementation, the processor 410 is a multi-threaded processor. The processor 410 may be enabled for processing instructions stored in the memory 420 or on the storage device 430 to display graphical information for a user interface on the input/output device 440. In one implementation, the memory 420 is a computer-readable medium. In one implementation, the memory 420 is a volatile memory unit. In another implementation, the memory 420 is a non-volatile memory unit. The storage device 430 may be enabled for providing mass storage for the system 400. In one implementation, the storage device 430 is a computer-readable medium. In various different implementations, the storage device 430 may be a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A system for enhanced information retrieval and knowledge discovery from a plurality of repositories, the system comprising:

a processor; and a memory communicably coupled to the processor, wherein the memory comprises processor-executable instructions which, when executed by the processor, cause the processor to:

receive a user input from a user via a user interface, wherein the user input comprises a user requirement and a user preference;

identify a user intent and a context of the received user input by parsing a plurality of keywords within the received user input;

extract multimedia content from a structured data source based on the identified user intent, the context, the user requirement, and the user preference, wherein the structured data source stores the multimedia content retrieved from the plurality of data repositories, wherein the extracting comprises:

generating, using a Generative Pre-trained Transformer (GPT) model, one or more prompts for retrieving the multimedia content from the structured data source based on the user intent and the context of the received user input;

fetching, using the generated one or more prompts, the multimedia content by using Application Programming Interfaces (APIs) and structured query language (SQL) queries from the plurality of data repositories, wherein the multimedia content includes information relevant to the user input;

process the extracted multimedia content using a generative Artificial Intelligence (AI) model; and store the processed multimedia content in the structured data store along with the source information of the extracted multimedia content;

generate at least one response to the received user input based on the processed multimedia content, wherein the at least one response comprises the processed multimedia content with corresponding links to one or more of the plurality of data repositories;

extract one or more keywords from the at least one response to generate one or more scores with respect to one or more criteria by matching the user input with the extracted one or more keywords;

determine, based on the generated one or more scores for the one or more criteria, a final score for the at least one response by combining the generated one or more scores for the one or more criteria, wherein determining the final score further comprises:

assigning a weight for each of the one or more criteria based on the plurality of the keywords within the received user input, wherein the one or more criteria include user intent alignment, content appropriateness, user preference match, and user profile match; and generating the one or more scores for the one or more criteria based on the assigned weight;

output, based on the final score, the at least one response including source information (URL) of the extracted multimedia content from the one or more of the plurality of data repositories on the user interface of a user device;

generate one or more suggestive prompts to the user, wherein the one or more suggestive prompts are generated based on one or more of the user intent, the context, the user requirement, the user preference, the at least one response generated to the received user input, and historical user inputs, wherein the one or more suggestive prompts represent the one or more prompts for the user input associated with follow up searches and questions;

generate, based on the one or more suggestive prompts, one or more responses; and output the one or more suggestive prompts and the corresponding one or more responses on the user interface of the user device, wherein the one or more responses comprise enhanced information including the processed multimedia content with corresponding links to one or more of the plurality of data repositories.

2. The system of claim 1, wherein the plurality of data repositories comprises one or more of a textual repository, an audio repository, and a video repository.

3. The system of claim 2, wherein the multimedia content retrieved from the audio repository comprises text.

4. The system of claim 2, wherein the multimedia content retrieved from the video repository comprises shots and transcripts.

5. The system of claim 1, wherein processing, by the processor, the extracted multimedia content using the generative Artificial Intelligence (AI) model is based on one or more of a profile of the user, the identified user intent, the context, the user requirement, and the user preference.

6. The system of claim 1, wherein to generate at least one response to the received user input based on the processed multimedia content, the processor is to:

generate a plurality of responses to the received user input using the processed multimedia content;

assign a rank for each of the plurality of responses based on relevance of each response to the received user input; and output the at least one response on the user interface based on the assigned rank.

7. The system of claim 1, wherein to identify the user intent and the context of the received user input by parsing the plurality of keywords within the received user input, the processor is to:

extract key insights of the received user input by mapping the plurality of keywords within the received user input with a prestored insight table; and correlate the user intent and the context of the user input with the extracted key insights using a generative AI model.

8. A method for enhanced information retrieval and knowledge discovery from a plurality of repositories, the method comprising:

receiving, by a processor, a user input from a user via a user interface, wherein the user input comprises a user requirement and a user preference;

identifying, by the processor, a user intent and a context of the received user input by parsing a plurality of keywords within the received user input;

extracting, by the processor, multimedia content from a structured data source based on the identified user intent, the context, the user requirement, and the user preference, wherein the structured data source stores the multimedia content retrieved from the plurality of data repositories, wherein the extracting comprises:

generating, using a Generative Pre-trained Transformer (GPT) model, one or more prompts for retrieving the multimedia content from the structured data source based on the user intent and the context of the received user input;

fetching, using the generated one or more prompts, the multimedia content by using Application Programming Interfaces (APIs) and structured query language (SQL) queries from the plurality of data repositories, wherein the multimedia content includes information relevant to the user input; processing, by the processor, the extracted multimedia content using a generative Artificial Intelligence (AI) model; and storing the processed multimedia content in the structured data store along with the source information of the extracted multimedia content;

generating by the processor, at least one response to the received user input based on the processed multimedia content, wherein the at least one response comprises the processed multimedia content with corresponding to one or more of the plurality of data repositories;

extracting one or more keywords from the at least one response to generate one or more scores with respect to one or more criteria by matching the user input with the extracted one or more keywords;

determining, based on the generated one or more scores for the one or more criteria, a final score for the at least one response by combining the generated one or more scores for the one or more for the one or more criteria, wherein determining the final score further comprises:

assigning a weight for each of the one or more criteria based on the plurality of keywords within the received user input, wherein the one or more criteria include user intent alignment, content appropriateness, user preference match, and user profile match; and generating the one or more scores for the one or more criteria based on the assigned weight;

outputting, by the processor, based on the final score, the at least one response including source information (URL) of the extracted multimedia content from the one or more of the plurality of data repositories on the user interface of a user device;

generating one or more suggestive prompts to the user, wherein the one or more suggestive prompts are generated based on one or more of the user intent, the context, the user requirement, the user preference, the at least one response generated to the received user input, and historical user inputs, wherein the one or more suggestive prompts represent the one or more prompts for the user input associated with follow up searches and questions;

generating, based on the one or more suggestive prompts, one or more responses; and outputting the one or more suggestive prompts and the corresponding one or more responses on the user interface of the user device, wherein the one or more responses comprise enhanced information including the processed multimedia content with corresponding links to one or more of the plurality of data repositories.

9. The method of claim 8, wherein the plurality of data repositories comprises one or more of a textual repository, an audio repository, and a video repository.

10. The method of claim 9, wherein the multimedia content retrieved from the audio repository comprises text.

11. The method of claim 9, wherein the multimedia content retrieved from the video repository comprises shots and transcripts.

12. The method of claim 8, wherein processing, by the processor, the extracted multimedia content using the generative Artificial Intelligence (AI) model is based on one or more of a profile of the user, the identified user intent, the context, the user requirement, and the user preference.

13. The method of claim 8, wherein generating the at least one response to the received user input based on the processed multimedia content comprises:

generating, by the processor, a plurality of responses to the received user input using the processed multimedia content;

assigning, by the processor, a rank for each of the plurality of responses based on relevance of each response to the received user input; and outputting, by the processor, the at least one response on a user interface based on the assigned rank.

14. The method of claim 8, identifying the user intent and the context of the received user input by parsing the plurality of keywords within the received user input, comprises:

extracting, by the processor, key insights of the received user input by mapping the plurality of keywords within the received user input with a prestored insight table; and correlating, by the processor, the user intent and the context of the user input with the extracted key insights using a generative AI model.

15. A non-transitory computer readable medium for enhanced information retrieval and knowledge discovery from a plurality of repositories, comprising a processor-executable instructions that cause a processor to:

receive a user input from a user via a user interface, wherein the user input comprises a user requirement and a user preference;

identify a user intent and a context of the received user input by parsing a plurality of keywords within the received user input;

extract multimedia content from a structured data source based on the identified user intent, the context, the user requirement, and the user preference, wherein the structured data source stores the multimedia content retrieved from a plurality of data repositories, wherein the extract multimedia content by:

generating, using a Generative Pre-trained Transformer (GPT) model, one or more prompts for retrieving the multimedia content from the structured data source based on the user intent and the context of the received user input;

fetching, using the generated one or more prompts, the multimedia content by using Application Programming Interfaces (APIs) and structured query language (SQL) queries from the plurality of data repositories, wherein the multimedia content includes information relevant to the user input;

processing the extracted multimedia content using a generative Artificial Intelligence (AI) model; and storing the processed multimedia content in the structured data store along with the source information of the extracted multimedia content;

generate at least one response to the received user input based on the processed multimedia content, wherein the at least one response comprises the processed multimedia content with corresponding links to one or more of the plurality of data repositories;

extract one or more keywords from the at least one response to generate one or more scores with respect to one or more criteria by matching the user input with the extracted one or more keywords;

determine, based on the generated one or more scores for the one or more criteria, a final score for the at least one response by combining the generated one or more scores for the one or more for the one or more criteria, wherein determining the final score further comprises:

assigning a weight for each of the one or more criteria based on the plurality of keywords within the received user input, wherein the one or more criteria include user intent alignment, content appropriateness, user preference match, and user profile match; and generating the one or more scores for the one or more criteria based on the assigned weight;

output, based on the final score, the at least one response including source information (URL) of the extracted multimedia content from the one or more of the plurality of data repositories on the user interface of a user device;

generate one or more suggestive prompts to the user, wherein the one or more suggestive prompts are generated based on one or more of the user intent, the context, the user requirement, the user preference, the at least one response generated to the received user input, and historical user inputs, wherein the one or more suggestive prompts represent the one or more prompts for the user input associated with follow up searches and questions;

generate, based on the one or more suggestive prompts, one or more responses; and output the one or more suggestive prompts and the corresponding one or more responses on the user interface of the user device, wherein the one or more responses comprise enhanced information including the processed multimedia content with corresponding links to one or more of the plurality of data repositories.

* * * * *